United States Patent [19]
Hosick

[11] Patent Number: 6,073,887
[45] Date of Patent: Jun. 13, 2000

[54] HIGH POWER SPACECRAFT WITH FULL UTILIZATION OF ALL SPACECRAFT SURFACES

[75] Inventor: Daryl K. Hosick, Santa Cruz, Calif.

[73] Assignee: Space Systems/Loral, Inc., Palo Alto, Calif.

[21] Appl. No.: 08/895,363

[22] Filed: Jul. 16, 1997

[51] Int. Cl.⁷ ...................................................... B64G 1/00
[52] U.S. Cl. ...................... 244/158 R; 244/164; 244/173
[58] Field of Search ................................ 244/158 R, 163, 244/173, 171, 164

[56] References Cited

U.S. PATENT DOCUMENTS

| | | | |
|---|---|---|---|
| 4,471,266 | 9/1984 | Fleury et al. | 315/3.5 |
| 4,880,050 | 11/1989 | Nakamura et al. | 165/41 |
| 5,332,030 | 7/1994 | Spencer et al. | 165/32 |
| 5,372,183 | 12/1994 | Strickberger | 165/41 |
| 5,634,612 | 6/1997 | Faisant | 244/158 |

FOREIGN PATENT DOCUMENTS 2 463 058  2/1981  France .

OTHER PUBLICATIONS

Mechanical Engineering, Nov. 1968 pp. 48–53 "Applications of the Heat Pipe" by Feldman, K.T. and Whiting, G. H.
European Search Report dated Nov. 16, 1998.
"Excess Liquid Formation In Orbit Test Results, etc.", Meyer et al, Journal of Spacecraft and Rockets, Sep./Oct. (1986), vol. 23,No.5, pp 482–486.
"The Thermal Control System of the German Direct . . . TV—Sat", Kreeb et al, AIAA 8th Comm. Satellite Systems Conf. (1980) Orlando, Fla., pp 171–177.

*Primary Examiner*—J. Woodrow Eldred
*Attorney, Agent, or Firm*—Perman & Green, LLP

[57] ABSTRACT

A spacecraft for deployment in geosynchronous orbit about the Earth, comprising six face panels which enclose a compartment containing electronic powering components mounted on the interior surfaces thereof. The panels include opposed north-facing and south-facing panels which do not undergo sun-exposure, remain cool and provide safe interior surfaces for the electronic powering components mounted thereon, and four side panels which are successively rotated into diurnal sun-exposure attitude during which their temperature normally rises so excessively as to damage electronic powering components mounted on the interior surfaces thereof. The invention comprises providing the east-facing and west-facing panels with at least one continuous circulation system containing a heat exchange fluid which absorbs heat from the one of said panels undergoing sun exposure and circulates it to the other of said panels to moderate the temperature of the east-facing and west-facing panels. This prevents heat-damage to electronic powering components mounted on the interior surfaces of the east and west panels, whereby the total interior surface area of the panels available for the safe mounting of the components is substantially increased.

17 Claims, 6 Drawing Sheets

FIG. 9

HIGH POWER SPACECRAFT WITH FULL UTILIZATION OF ALL SPACECRAFT SURFACES

FIELD OF THE INVENTION

The invention relates generally to a means for providing a spacecraft with very high power dissipation capability. More specifically, this invention discloses a spacecraft thermal management system using heat transfer devices and high temperature operation of specific equipment to allow utilization of all spacecraft surfaces for thermal energy dissipation and for mounting of additional equipment.

BACKGROUND OF THE INVENTION

At present there is a high market demand for spacecraft, particularly satellites, with increased communication and scientific payloads. Operation of such spacecraft require increased capabilities to power larger payloads and therefore require corresponding increased capability to dissipate thermal energy. Providing spacecraft with sufficient thermal dissipation capability to maintain equipment at operating temperatures is a fundamental problem of spacecraft design.

Dissipation of excess thermal energy from spacecraft presents a unique combination of problems. The primary excess power dissipation means for all spacecraft is radiation into space through panels exposed to outer space. These panels are augmented with coatings, or applied surfaces, designed specifically to maximize radiation capability. Since the panels are also subjected to sun energy, the coatings, or applied surfaces are also designed to minimize absorpance of sun energy. Also, the thermal dissipation capability of the panels is a function of the operating temperature of the panels, the higher the temperature, the greater the dissipating capability. The maximum temperature is limited, however, to the maximum operating temperature of mounted equipment, primarily electronics, being cooled by the radiator panels. The maximum thermal dissipation capability of the system is therefore limited by the area of the dissipating panels, the operating temperature of the panels, and the quality of the panel surface exposed to space.

STATE OF THE ART

Substantially increasing the area of the panels is generally not an available option to increase thermal dissipation rates of spacecraft. This is because the panel areas are limited by the available fixed volume within the spacecraft launch vehicle. Redesigning and building larger launch vehicles is expensive and even if larger launch vehicles were available the enormous expense per unit mass to place a spacecraft in space via such launch vehicles would discourage building larger spacecraft. However, U.S. Pat. No. 5,117,901 of Davis discloses a method of increasing available thermal radiator area by deploying a radiator panel to increase available radiating area after the spacecraft is placed in orbit. Davis further describes a method of transferring heat energy from spacecraft mounted equipment to the deployed radiator panel. This design must contend with the complexity of providing a heat pumping system to an extended mechanism using flexible joints. In addition deployable radiator panels use up available launch vehicle volume and when deployed may interfere with proper operation of spacecraft antennas and sensors.

Since it is not known how to substantially increase the thermal properties of the materials used in the radiator panels, the operating temperature of the panels, the remaining limitation, must be addressed. A spacecraft's panels undergo extreme temperature swings throughout its mission. The nature of the temperature swings depends on the orientation of the spacecraft relative to the sun. The typical communications spacecraft in Earth equatorial orbit possesses control systems which maintain a specific attitude in three axis. The spacecraft is of box or rectangular configuration with two surfaces aligned perpendicular to the line passing from the Earth's north to south poles (sides 21 and 22 of FIG. 1, commonly referred to north and south panels). The remaining surfaces which have orientation maintained through the attitude control system: include 1) a surface commonly referred to as the Earth panel which continuously faces towards the Earth, 2) an anti-Earth panel which continuously faces away from the Earth, 3) an east panel whose normal is continuously parallel to the orbit velocity direction, and 4) a west panel, opposing the east panel, with normal anti-parallel to the orbit velocity direction. Because of the nature of the equatorial orbit the sun energy is minimal on the north and south panels while the other four panels are exposed to direct sun energy once each orbit period.

Traditionally, only the cooler north and south panels are used for radiator surfaces for temperature sensitive equipment mounted nearby. The other panels are avoided since they are exposed alternately to direct sunlight and shade thereby experiencing extreme diurnal temperature variations. Direct sun energy results in very low dissipating capability of these panels at the temperatures normally required by spacecraft electronic equipment. Furthermore, the wide diurnal temperature variations experienced by these panels results in daily equipment stresses which reduce the lifetime of components mounted thereon or nearby.

However, the surface area of the more temperate north and south panels is limited, and there is not sufficient room to support the additional equipment needed to meet the additional communication demands of present markets. It would be most desirable to add more equipment on the remaining panels, especially the east and west panels. However as noted above the diurnal temperature variations would stress this equipment beyond tolerable limits. Even if the temperature could be controlled to be the same as the north and south panels, then all surfaces of the spacecraft would be required to be at a temperature too low to radiate sufficient heat generated by the mounted components, mainly electronic components.

OBJECTS AND ADVANTAGES

In light of the above, it is a primary object of this invention to provide a means for increasing the thermal dissipation capability of a spacecraft, increasing the spacecraft's equipment capacity, and avoiding the problems of the prior art. It is a specific object to provide such means which utilizes the east and west panel surfaces for mounting equipment and for radiating from these panels thermal dissipation in a highly efficient manner. It is another object to provide such means which is readily testable on the ground. It is yet another object to minimize diurnal temperature variations on the east and west panels, providing an environment suitable for certain spacecraft electronics.

SUMMARY OF INVENTION

The present invention relates to a satellite or spacecraft of conventional rectangular design, adapted to be deployed in geosynchronous orbit about a planet, such as Earth, in fixed attitude or orientation relative thereto while four of the panels or faces thereof undergo daily successive exposure to the sun followed by shading from the sun. The temperature variations on the face panels, particularly the east and west panels, are minimized by heat-exchange means which transfers heat from panels in direct sunlight to shaded panels, thereby warming the latter and cooling the former to adapt the east and west panels for the mounting thereon of higher temperature capable components. As spacecraft traditionally utilize only the north and south facing panels which do not undergo direct sunlight exposure, this substantially increases the panel surface area suitable for the mounting thereon of electronic components useful for the functioning of the satellite or spaceship since it reduces the temperature extremes or diurnal temperature range of the panels associated by the heat-exchange means.

DETAILED DESCRIPTION

Figure 1:
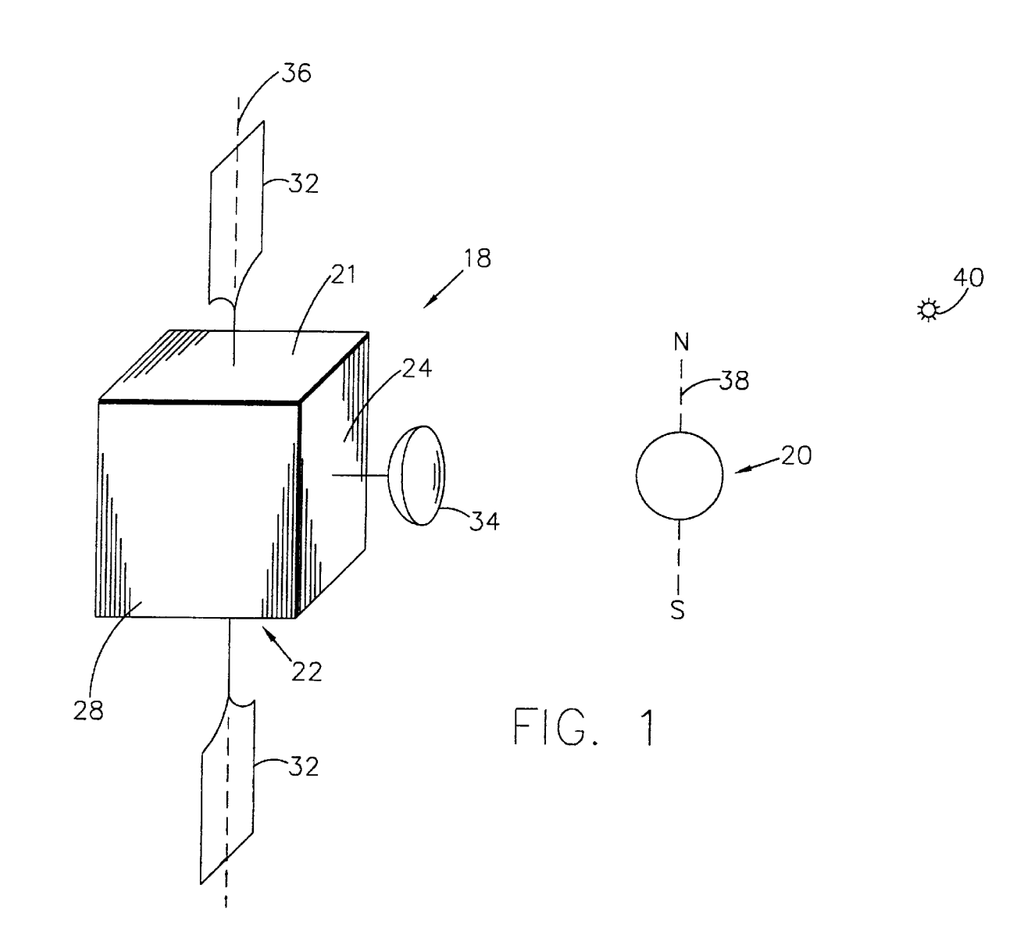
FIG. 1 is an illustration of the alignment of an orbiting spacecraft and its panels with respect to the Earth.
Figure 2:
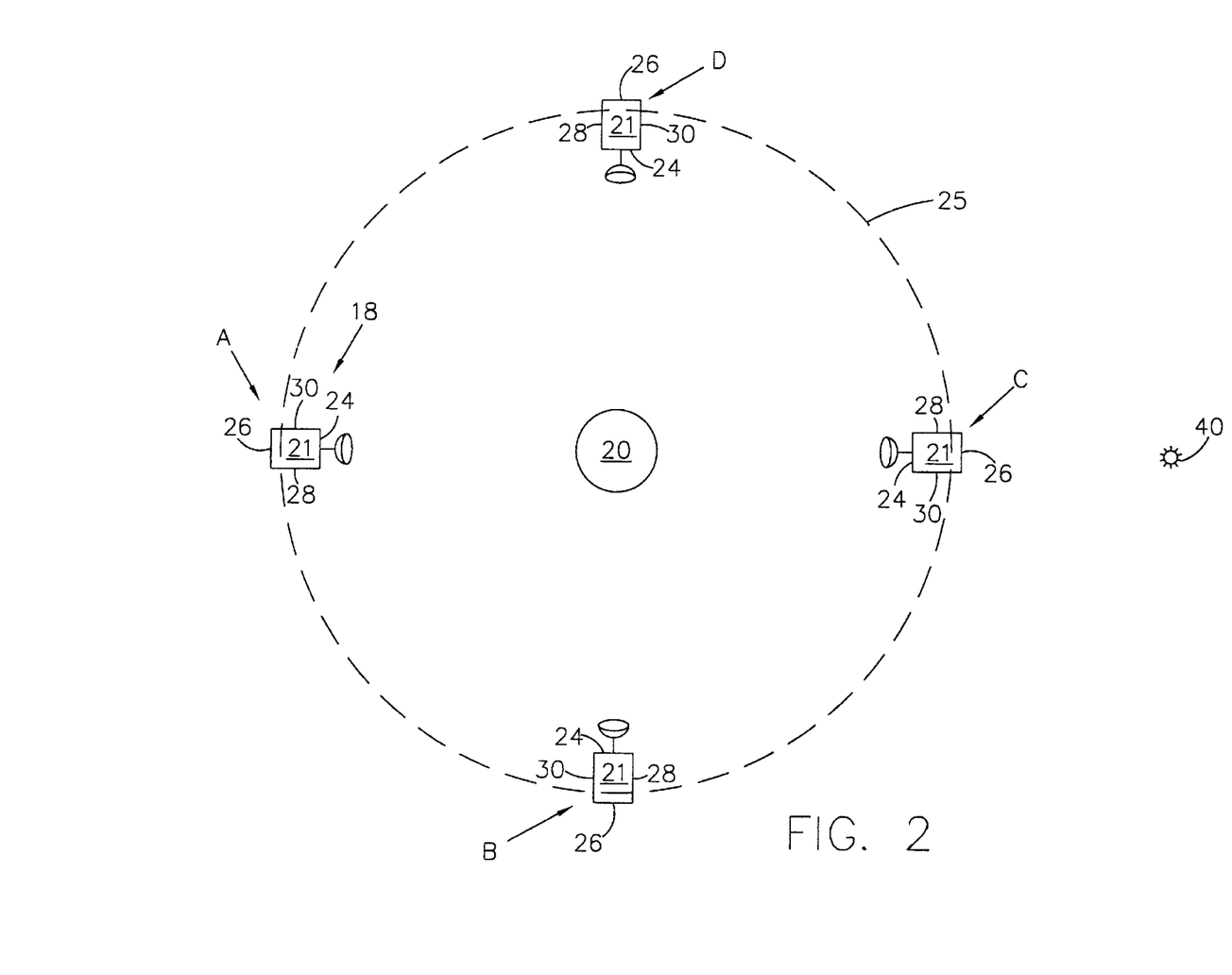
FIG. 2 is an illustration showing each of four side panels of a spacecraft receiving sun energy at a different position along an Earth-centered orbit.

FIG. 1 depicts a typical satellite or spacecraft 18 in a substantially equatorial geosynchronous orbit about a planet 20, commonly Earth. Spacecraft 18 has conventional control means, commonly found in the art, to maintain the attitude or orientation of spacecraft 18 as shown in FIG. 1. In particular, spacecraft 18 comprises a box structure with six principal sides: a north panel 21, a south panel 22, an Earth panel 24, an anti-Earth panel 26, an east panel 28, and a west panel 30. (West panel 30 and anti-Earth panel 26 are shown in FIG. 2.) A north-south axis 36 through the center of spacecraft 18, and normal to both north and south panels 21 and 22, is maintained nearly parallel to the north-south Earth axis 38 throughout the spacecraft's orbit. Earth panel 24 continuously faces the Earth 20 as the spacecraft orbits the Earth. The very distant sun 40 is shown to the right of Earth 20 in FIG. 1.

Other conventional features commonly found on a spacecraft which are shown in FIG. 1 for spacecraft 18 are solar array panels 32 on the north and south panels 21 and 22, and a communication antenna 34 on Earth panel 24. The nature of the solar array panels 32 and the type and quantity of antennas found on a given spacecraft vary, and the details thereof are not important for the implementation of the present invention. In fact, the invention is applicable to other types of spacecraft including scientific and weather satellites, and non-geosynchronous spacecraft including low Earth-orbiting satellites.

FIG. 2 illustrates the orbiting spacecraft 18 and its north panel 21 as seen from the north side of the north-south Earth axis 38, shown in FIG. 1, looking towards Earth 20. FIG. 2 illustrates four orbit positions A, B, C, D of spacecraft 18 along its orbit 25 about Earth 20. In orbit position A Earth panel 24 receives sun energy directly, while the remaining panels do not. Similarly, in position B east panel 28 most directly faces the sun 40, while in position C anti-Earth panel 26 most directly faces the sun, and in position D west panel 30 most directly faces the sun.

During one 24 hour cycle, spacecraft 18 moves through orbit positions A, B, C, D respectively. Each panel 24, 26, 28, and 30 experiences an extreme diurnal temperature swing during each cycle. However, regardless of the position of spacecraft 18 along the orbit, north panel 21 and south panel 22 receive nearly constant, minimal sun energy and experience limited if any diurnal temperature variation. Therefore prior art spacecraft have limited the mounting of electronic equipment to the cooler less extreme environments of the north panel 21 and south panel 22.

Figure 3:
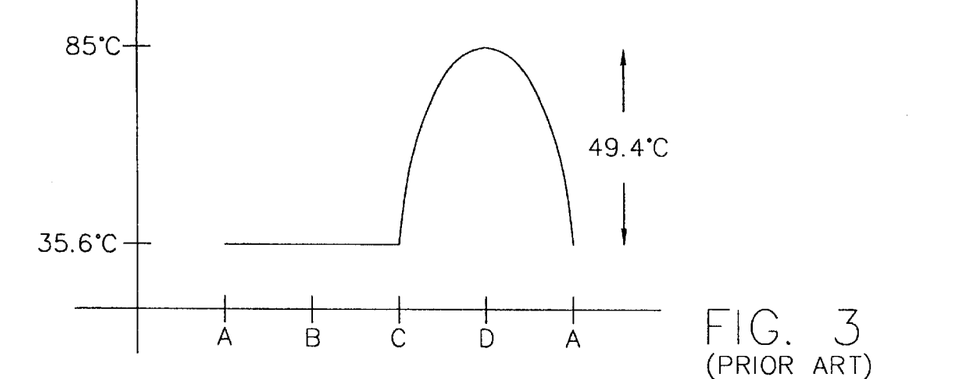
FIG. 3 is a graphic illustration plotting temperature versus orbit location for a west panel of a prior art spacecraft.

FIG. 3 shows an idealized plot of the temperature of the west panel 30 of a conventional spacecraft over a one day cycle. While the spacecraft is in orbit positions A, B and C, west panel 30 receives no sun energy and therefore reaches minimal temperature. However, from orbit position C through D to A, west panel 30 is exposed to sun energy and therefore its temperature becomes elevated, peaking in position D where west panel 30 receives sunlight directly. The difference between the maximum temperature at position D and the minimum temperature reached between points A and C is the diurnal temperature swing or variation (49.4° C. for the example shown in FIG. 3). The east panel 28 undergoes a similar diurnal temperature variation, but its temperature peaks at orbit position B and is minimal from orbit position C through D to A.

Figure 5:
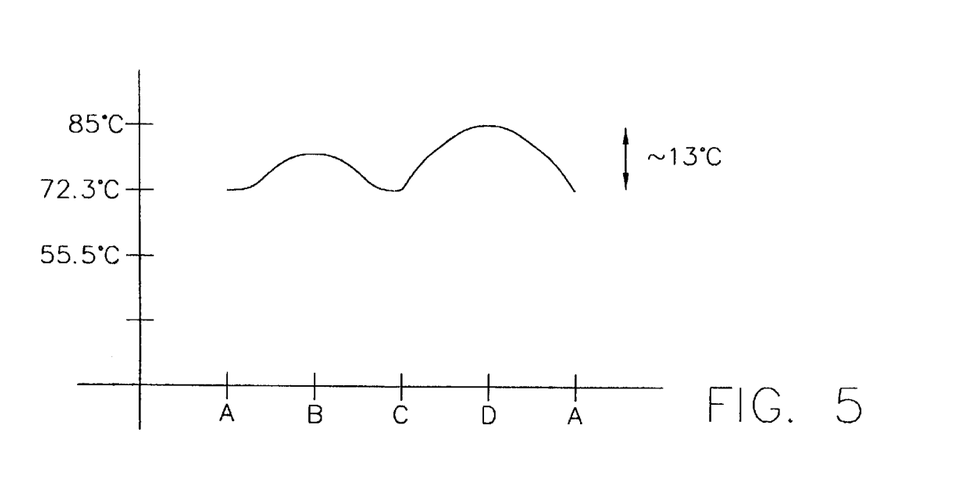
FIG. 5 is a graphic illustration plotting temperature versus orbit location for a west panel of a spacecraft having the complete heat transferring means according to a preferred embodiment of the present invention.

The present invention provides means to reduce the diurnal temperature range, particularly on the east and west panels 28 and 30, so that the panels 28 and 30 can be utilized for mounting additional electronics components and for radiating the heat generated by the additional equipment, enabling a more powerful spacecraft. Specifically, the present invention comprises mounting electronics components capable of operating at higher temperatures on the east and west panels 28 and 30, reserving the north and south panels for the mounting of equipment which is operational at colder temperatures, and implementing a heat transferring means which transfers or exchanges heat between the east and west panels 28 and 30. For example, when east panel 28 receives direct sunlight at orbit position B, the heat transfer means absorbs and conducts some of the absorbed sun energy therefrom and transfers it to the shaded, cool west panel 30. This warms panel 30 during a point in the orbit in which panel 30 is shaded and otherwise would reach its lowest temperature, thereby decreasing the diurnal temperature variation. FIG. 5 is a plot of the temperature profile for west panel 30 provided with a complete heat transferring means according to a preferred embodiment of the present invention.

With thermal transferring means incorporated into the east and west panels 28 and 30, both panels can effectively radiate thermal energy simultaneously. In addition, since these panels are at a higher temperature than the north and south panels 21 and 22, they are relatively better radiators than the latter since a panel's ability to radiate thermal energy is proportional to its temperature to the fourth power.

North and south panels 21 and 22 of the present spacecraft 18 do not receive direct sun energy and are maintained at or below temperatures similar to prior art spacecraft, typically about 55° C. Electronic equipment components which quickly degrade at higher temperatures, in particular certain communication and data handling electronics, are mounted on the inside wall surfaces of these north and south panels 21 and 22 and thereby are provided a sufficiently cool and stable environment to function properly. As in conventional spacecraft, the outer wall surface of each panel 21 and 22 is made of a suitable radiator material, preferably optical solar reflector (OSR) paneling (also known as a second surface mirror). According to the present invention, equipment which is capable of operating at higher temperatures, without degradation, is mounted on the inside wall surfaces of the east and west panels 28 and 30, and these panels are allowed to attain normal higher temperatures, e.g. 85° C. Panels 28 and 30, operating at the higher temperature, are made into radiators, that is, given surfaces designed to radiate heat and reflect sunlight. This is readily accomplished by attaching a layer of OSR to the outside wall of each panel, or any other conventional radiating material known in the art. It should be noted that prior art spacecraft generally do not radiate thermal energy from the east and west panels. Prior art east and west panels are usually covered with thermal blanketing, which reflects sunlight but does not radiate thermal dissipation. Hence, providing the east and west panels 28 and 30 with means for thermal dissipation greatly improves a spacecraft's ability to radiate overall thermal energy. In addition, since the east and west panels 28 and 30 reach a significantly higher temperature than the north and south panels 21 and 22, the east and west panels radiate energy at greatly enhanced rates.

Equipment which may be safely and reliably operated at higher temperatures include, but are not limited to, the following hardware: Traveling wave tubes; Radio frequency (R.F.) Switches; Output multiplexers; R.F. wave guides; R.F. power combiners and loads, and similar heat-resistant high temperature capability equipment or components.

In prior art spacecraft such high temperature capability equipment was generally mounted on the north and south panels and operated at the lower temperatures dictated by the remaining more temperature sensitive equipment, mounted on the same panels. The separation of high temperature capability equipment, according to this invention, is an especially advantageous division; the components are directly interconnected so that all high temperature equipment can be mounted and tested on the same high temperature panels 28 and/or 30.

It is emphasized that the above list of temperature capable components is specific to equipment for a communication satellite. For other spacecraft applications, scientific, weather and otherwise, a skilled artisan can readily segregate temperature-resistant components from the others required for such applications.

Figure 6:
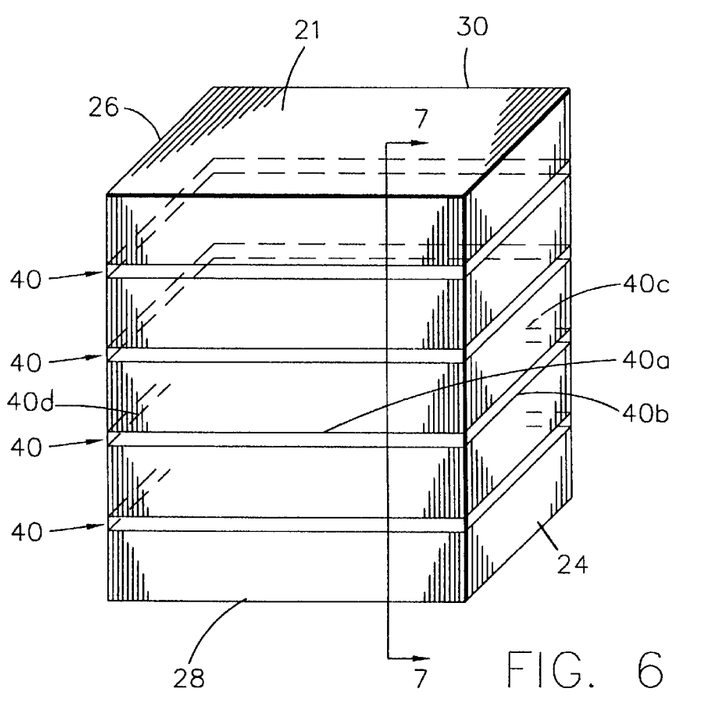
FIG. 6 is a perspective view of a spacecraft body with heat pipe loops to transfer heat between east and west panels.

FIG. 6 depicts a main portion of spacecraft 18 provided with a heat transferring means comprising four continuous loops of heat pipes 40 which circulate heat-transfer fluid from east panel 28 along Earth panel 24 to west panel 30 to anti-Earth panel 26 and back to east panel 28. Other heat transferring means known in the art, such as capillary pump loops, are also suitable.. Loops of heat pipes 40, preferably copper pipe filled with water, or aluminum pipe filled with toluene or ammonia, for example, are systems well known in the art for absorbing heat into a heat exchange fluid at a hot surface, and circulating said fluid to a cold surface to conduct the heat thereto and thereby reduce the temperature differential between said surfaces. Each heat pipe circulation loop 40 of FIG. 6 comprises a heat pipe section 40a mounted between or within inner and outer walls of east panel 28, and a heat pipe section 40c mounted between or within inner and outer walls of west panel 30. A crossing heat pipe section 40b runs along Earth panel 24 connecting sections 40a to 40c, and a crossing heat pipe section 40d runs along anti-Earth panel 26, completing the circulation loop by connecting the other ends of section 40c and 40a. The total number of heat pipe circulation loops 40 and their capacity and location depend upon the heat dissipation requirements of the particular spacecraft and can readily be determined by those skilled in the art by ordinary thermal computations.

Figure 7:
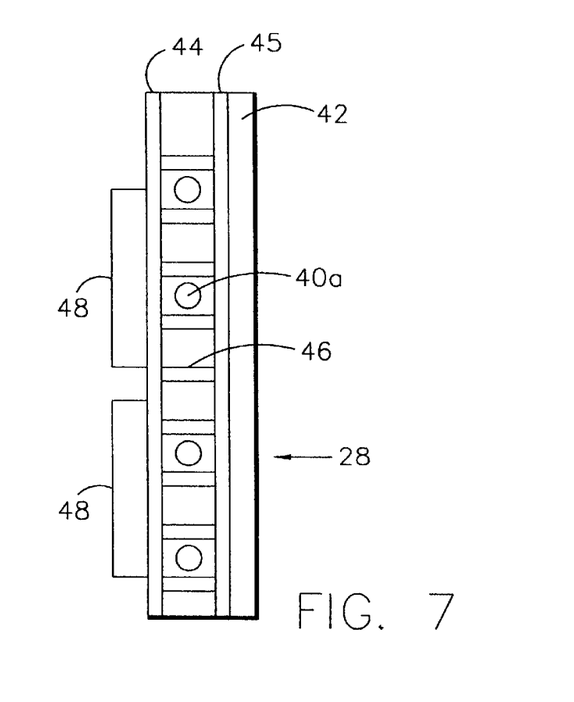
FIG. 7 is a cross-sectional view of the east panel of FIG. 6, taken along the line 7—7 thereof, showing higher temperature capable equipment mounted on the interior wall of the panel, heat pipes embedded between the panel walls, and radiator material mounted on the exterior panel walls.

FIG. 7 illustrates a cross section of east panel 28 (a cross section of west panel 30 is similar) cutting through the inner and outer walls and the heat pipe sections 40a. Heat pipe sections 40a are supported between an interior face skin, sheet, or foil 44 and an exterior face skin, sheet or foil 45, preferably and commonly made of thin aluminum foil. Heat conducting cross struts or ribbons 46, preferably of honey comb structure well known in the art, support both face skins 44 and 45. High temperature capability components 48 are shown mounted on interior face skin 44 and support struts 46 on the surface of east panel 28 interior to spacecraft 18. Heat generated by components 48 primarily conducts through interior skin 44, where a portion of it is absorbed and redistributed to west panel 30 via heat pipe loops 40, while the remaining portion of the heat conducts along cross struts 46, through exterior skin 45 and is radiated to space through an outermost conventional surface or radiator panel 42. Radiator panel 42, preferably made of OSR, reflects incident optical sunlight while behaving like a black body radiator for infrared or thermal radiation. Some of the thermal energy from within east panel 28 is absorbed by radiator panel 42 and radiated into space.

Radiator panel 42 also absorbs a substantial portion of infrared or thermal energy from incident sunlight. In orbit position B of FIG. 2, the absorbed sun energy is conducted into the interior of east panel 28 where a fraction will reach components 48, but a significant portion will be absorbed by the heat exchange liquid and circulated within the heat pipe loops 40 to warm the shaded west panel 30. Specifically thermal energy is absorbed by the fluid within heat pipe section 40a, passes through crossing heat pipe section 40b and through heat pipe section 40c in panel 30 where the thermal energy is absorbed from loop 40 and warms equipment on the west panel 30. It is noted that crossing heat pipes 40b and 40d are not necessarily mounted within their respective panels 24 and 26. Depending upon the thermal requirements for the specific spacecraft, these pipes are either thermally isolated from the Earth and anti-Earth panels 24 and 26 or mounted within inner and outer walls of the panels. In prior known spacecraft, the Earth and anti-Earth panels do not function as radiator panels.

The parallel arrangement of heat pipe loops 40 shown in FIGS. 6 and 7 is especially advantageous for on-ground thermal testing. A zero-gravity environment can be simulated on the ground only for horizontal heat pipes. For satellite 18 this is readily accomplished by positioning the north and south panels 21, 22 level to the ground. Any heat circulation pipes in the north and south panels will be horizontal and heat circulation pipe loops 40 in the other panels will also be horizontal.

Figure 4:
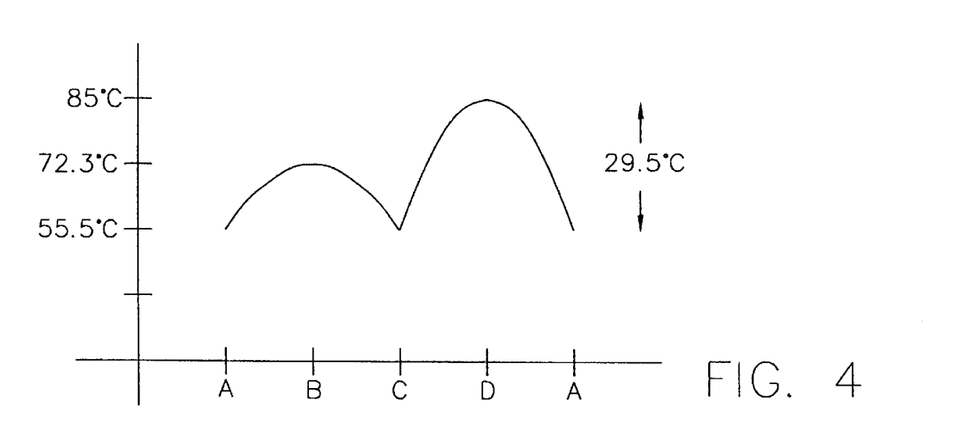
FIG. 4 is a graphic illustration plotting temperature versus orbit location for a west panel of a spacecraft with heat pipe circulation loops according to the present invention and no additional heating means at position A and C of FIG. 2.

Without heat circulation pipe loops 40, when sun energy is most directly incident on east panel 28, as in orbit position B of FIG. 2, west panel 30 is shaded and at its coolest point along the orbit, and is in greatest need of thermal energy to minimize the diurnal temperature variation. Location B is precisely the orbit position where the heat pipe loops 40 according to this invention can and do absorb and transfer the most sun energy or heat from east panel 28 to west panel 30. FIG. 4 shows an idealized plot of the temperature of west panel 30 along the orbit, with heat pipe loops 40 implemented. Note that the temperature of west panel 30 at orbit position B has risen closer to the peak temperature of 85° C. at position D. Also, as illustrated the minimum temperatures at points A and C have risen to 55.5° C. at the lowest value, and because of this, the diurnal temperature variation shown in FIG. 4 is 29.5° compared to 49.4° as shown in FIG. 3. Panel 30 does not warm up more at positions A and C because at these positions there is no direct sun energy on either the east or west panels and hence the heat pipe loops 40 do not have more sun energy to transfer to warm either panel at these positions. This however assumes that crossing heat pipe sections 40b and 40d of the Earth and anti-Earth panels are thermally insulated from incident sun energy upon these panels.

Figure 8:
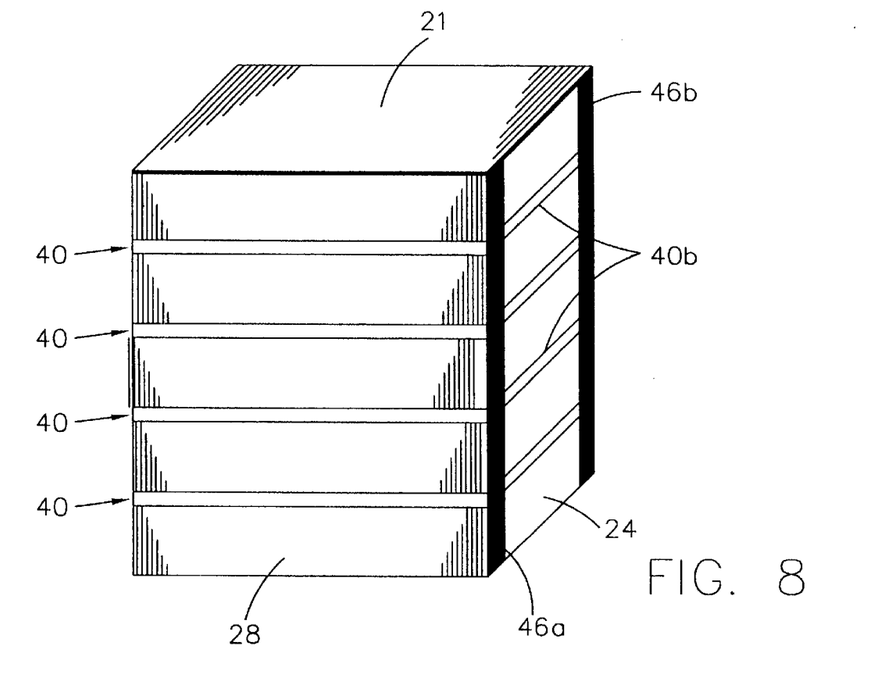
FIG. 8 Is a perspective view of a spacecraft body with heat pipe loops and black stripes on the Earth panel deck to transfer heat in orbit position A of FIG. 2 to the east and west panels according to a preferred embodiment of the present invention.
Figure 9:
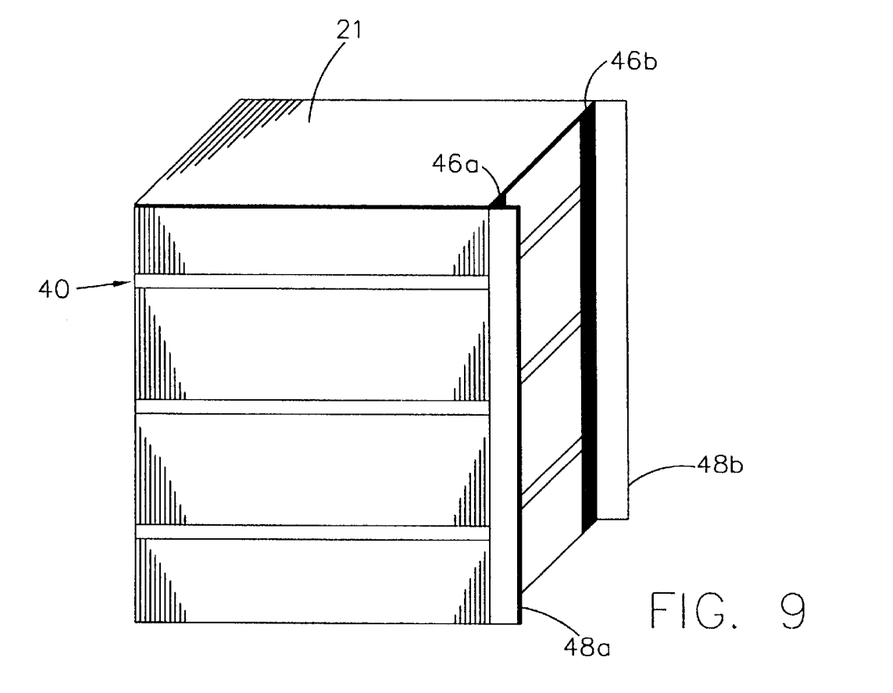
FIG. 9 is a perspective view of a spacecraft body with the same heat transferring means as in FIG. 8, but with additional shading panels to reduce heat absorbed by the black stripes in orbit positions other than A of FIG. 2, according to another preferred embodiment.

According to a preferred embodiment, illustrated by FIGS. 8 and 9, additional means are incorporated for further warming the east and west panels at orbit locations A and C thus further reducing the diurnal. Implementing one or a combination of these means leads to a temperature plot as shown in FIG. 5 for the temperature of west panel 30. The plot shows, at points A and C, an increase in temperature of panel 30 and an overall reduction in the diurnal, down to 13° C. This is readily accomplished by placing electrical heaters (not shown) on the east and west panels which operate while spacecraft 18 is in positions A and C. A second and preferable option is to use solar heaters 46a and 46b as shown in FIG. 8. Solar heaters 46a and 46b are stripes of black material placed along the east and west edges of Earth panel 24, and extend between the north and south panels 21 and 22. The solar heaters or black stripes 46a and 46b thermally couple to the crossing heat pipe section 40b. Therefore when the black stripes absorb sun energy in position A the energy is transferred to heat pipe section 40b and transported to the east and west panels 28 and 30. FIG. 9 shows shading panels 48a and 48b which shade stripes 46a and 46b from sun energy at positions outside of A. The shading can be implemented if energy absorbed by the stripes outside of position A is more than adequate. Similarly-placed black stripes and shades (not shown) along the east and west edges of anti-Earth panel 26 reduce the diurnal at position C. Of course, depending on the spacing of heat pipe loops 40, it may be preferable to have 2 or more black patches, rather than continuous stripes along the edges of panel 24 and 26.

A third option to reduce diurnal, is to place radiator panels, or OSR, on the Earth and anti-Earth panels 24 and 26 and allow heat pipes 40b and 40d to transfer incident sun energy from these panels in orbit position A and C, respectively, to east panel 28 and west panel 30. This option allows for the placement of additional high temperature capability equipment on the Earth and anti-Earth panels, 24 and 26 allowing full utilization of each surface. However Earth panel 24 usually is occupied by communication antenna equipment and may be more limited in the amount of additional equipment it can support. Anti-earth deck 26 similarly is capable of supporting additional equipment although a portion of its area is typically reserved for the main satellite thruster.

Figure 10:
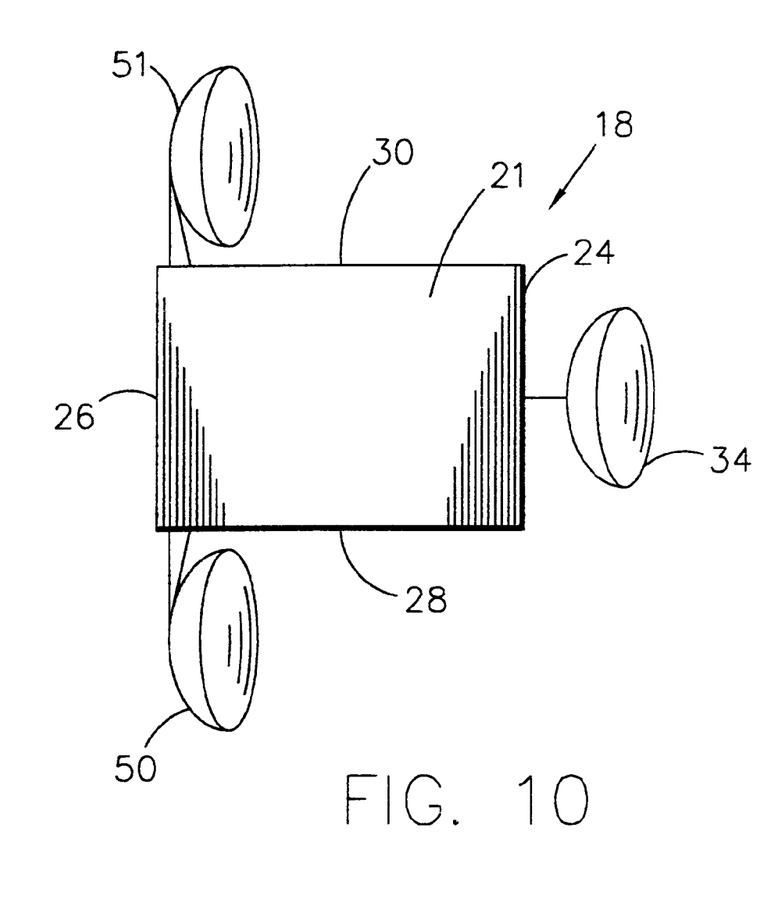
FIG. 10 is a perspective view of a spacecraft with east and west mounted communication reflectors which, in addition to providing the spacecraft with communication capabilities advantageously warms the east and west panels in orbit positions A and C of FIG. 2 according to another preferred embodiment of the present invention.

An especially preferable way to warm west and east panels at points A and C for some spacecraft is in fact accomplished by not adding any additional heating means, but by making use of pre-existing equipment. Most satellites have large reflecting antennas protruding near the edge joining the anti-Earth deck and east and west panels. FIG. 10 shows a reflector 50 attached to the edge joining panels 26 and 28 and a reflector 51 attached to the edge joining panels 26 and 30. The exact location of the attachments may vary from spacecraft to spacecraft and is not crucial for the present invention. Reflectors 50 and 51 are designed to reflect RF signals and typically black. The reflectors therefore behave as black body radiators for thermal energy. In fact, when reflectors receive direct sun energy it is not uncommon for them to reach temperatures near 70° C. Reflectors 50 and 51 absorb thermal energy from the sun and re-radiate the thermal energy, a substantial portion of which will be absorbed by and therefore warm the nearby east panel 28 and the west panel 30 the surface of these panels, OSR, is a black body absorber/radiator for thermal energy). Furthermore, reflectors 50 and 51 receive the most direct sun energy at points A and C in the orbit of spacecraft 18, and therefore warm panels 30 and 28 most effectively precisely when they need the heat the most. Thus, with reflectors 50 and 51 the plot of temperature versus orbit position for the west panel 30 is similar to FIG. 5, showing a substantially reduced diurnal temperature variation over FIG. 3.

Prior art satellites, limited in size, weight, and launch vehicle fairing envelopes typically handle less than 5,000 Watts DC, providing not much more than 3,000 Watts of RF radiated power and radiating 2,000 Watts of dissipation. The present configuration permits upwards to 15–20 kilowatts in DC, 6,500 Watts of RF radiated power, and capability of radiating 13,500 Watts of thermal dissipation.

For better understanding of how transferring heat between the east and west panels leads to a reduced diurnal temperature variation, the following theoretical explanation is given. Those skilled in the art will recognize the following equation of thermal energy conservation for a radiator panel:

$$G_\alpha \cos \phi + Q/Ap = \epsilon \sigma T^4 \qquad (1)$$

where the term proportional to $T^4$ is the power per area radiated by the radiator panel having temperature T (in Kelvin) and emissivity $\epsilon$. Constant $\sigma = 5.67 \times 10^{-8}$ Watts/$m^2$–° K is the Stepfan-Boltzmann constant. For OSR panel near the end of life we take $\epsilon = 0.78$ for illustrative purposes. Terms on the left hand side of equation (1) represent power per unit area being absorbed by the radiator panel. The first term is the thermal or infrared sun energy absorbed by the OSR; the flux of solar energy impinging on a panel normal to the sun is about G=1385 Watts/$m^2$, and $\alpha$ the absorptivity, is the fraction of incident solar energy the OSR will absorb. A typical end of life value for OSR is =0.235 and is significantly less than unity because as already noted the OSR reflects the optical light component of the solar flux, absorbing primarily the smaller infrared component. When the incident sun makes an angle $\phi$ with respect to the normal to the radiator panel, the amount of incident solar radiation impinging on the radiator panel is reduced from the normal incident value by a factor of cos $\phi$. The second term Q/Ap is the power Q per radiator panel area Ap of thermal energy dissipated by spacecraft equipment which the panel absorbs. This term Q/Ap is called the radiator dissipation capability.

If equipment were not segregated into hotter and cooler operating components and were mounted together on east or west panels 28 and 30 then these panels would have to be maintained at the same temperature as the north and south panels 21, 22, say T=55° C.=328° K. Then the amount of thermal dissipation that the east panel 28 could remove from equipment, Q/Ap, would be:

$$Q/Ap = \epsilon\sigma T^4 - G_\alpha \cos\phi = 186 \text{ Watts/m}^2. \quad (1),$$

assuming the sunlight is normal on east panel 28 (i.e. position B) and no heat transferring means exists between east and west panels. If instead components are segregated into hotter and cooler categories according to the invention, with hotter equipment on the east and west panels 28, 30, then east panel 28 can be operated at higher temperatures, say T=85° C.=358° K when at orbit position B. The dissipation capability of such a panel becomes $$Q/Ap = \epsilon\sigma T^4 - G_\alpha \cos\phi = 401 \text{ Watts/m}^2, \quad (2)$$

which is considerably higher than the value given by equation (1).

While the spacecraft 18 is at orbit position B, the east panel 28 is receiving direct sunlight and is at temperature T=85° C.=358° K and the west panel is receiving no direct sunlight. However, the west panel 30 still must remove about the same thermal dissipation from the components, Q/Ap=401 W/m², as the east panel (assuming electronics are distributed equally among the panels). Therefore the temperature of the west panel 30 in position B when there is no east/west heat transferring means implemented is $$T = [Q/(Ap\ \epsilon\sigma)]^{0.25} = [401/(\epsilon\sigma)]^{0.25} = 309° \text{ K} = 35.6° \text{ C}. \quad (3)$$

Thus without the heat transferring means according to the invention the diurnal temperature variation is 85° C.−35.6°=49.4° C. as shown by FIG. 3.

We now consider the case illustrated in FIG. 4 where the heat transferring means, i.e., heat pipe loops 40, absorb a fraction, say 35%, of the incident sun energy on the east panel and transfers it to the west panel 30. With the spacecraft 18 in position B where direct sun impinges on the east panel 28 at T=85° C. and no sunlight impinges directly on the west panel 30, the equation of power for the east panel is $$Q/Ap = \epsilon\sigma T^4 - G_\alpha \cos\phi(1-0.35) = 515 \text{ Watts/M}^2, \quad (4)$$

where Q/Ap=401 W/m² and $\phi$=90°. This yields a radiator capacity of Q/Ap=515 W/m² with heat pipe loops 40, an improvement of more than 100 W/m². The west panel 30 is now receiving from the heat pipe loops 40 about 35% of the absorbed incident sun energy from the east panel 28. Furthermore, west panel 30 absorbs Q/Ap=515 W/m² of dissipation from west panel mounted electronics. The following conservation of energy equation determines the temperature of west panel 30:

$$T = [(Q/Ap + 0.35G_\alpha)/\epsilon\sigma]^{0.25} = 72.3° \text{ C}. \quad (5)$$

The west panel has warmed considerably at position B. However, the lowest temperature reached by either panel is in positions A and C, provided the additional heating means (black stripes or reflectors) are not incorporated. In these positions west panel 30 and east panel 28 have temperature $$T = [Q/(Ap\ \epsilon\sigma)]^{0.25} = [515/(\epsilon\sigma)]^{0.25} = 328.5° \text{K} = 55.5° \text{ C}. \quad (6)$$

The diurnal is therefore 85° C.−55.5° C.=29.5° C. which may be acceptable for several applications. However having reflectors 50 and 51 and/or black stripes 46a, 46b as described above will raise this lowest temperature significantly.

To implement the preferred embodiment of adding black stripe solar heaters, consider a stripe material 46a, 46b, of FIGS. 8 and 9, with emissivity of $\epsilon_s$=0.85 and absorptivity $_s$=0.85. Let the area of one stripe, for example 46b, be $A_s$. The area of west panel 30 remains Ap. For a rough estimate it is assumed that the sun energy absorbed by single stripe 46b is completely transferred to west panel 30. If the size of area $A_s$ is such that the sun energy absorbed by stripe 46b in position A or C equals the amount of heat transferred at point B from east panel 28 to west panel 30 then, $$A_s(G_{\alpha s}) = 0.35 GAp. \quad (7)$$

This results in the west panel having a temperature T=72.3° C. at position A and C which is the same temperature it has as at point B, and the ratio between stripe area to west panel area satisfies $$A_s/Ap = 0.097. \quad (8)$$

For example if area A is 6.0 meters by 4.2 meters, then a suitable dimension of one stripe is 6.0 meters by 40.7 centimeters. The diurnal temperature variation reduces to about 85° C.−72.3° C.=12.7° C., which is much lower than needed. A skilled artisan can readily size the stripes for a given application. In particular the stripe widths can be reduced if a larger diurnal is acceptable. Also the fraction of energy transported by the heat pipe loops 40 can be substantially reduced, say to 25%, and any combination of stripes, OSR's and reflectors or even electrical heaters can be implemented to increase the minimal temperatures at positions A and C.

It is to be understood that the above described embodiment of the invention is illustrative only, and that modifications thereof may occur to those skilled in the art. Accordingly, this invention is not to be regarded as limited to the embodiment disclosed herein, but is to be limited only as defined by the appended claims.

What is claimed is:

1. A spacecraft for deployment in geosynchronous orbit about the Earth in substantially fixed orientation relative thereto, comprising a plurality of face panels which enclose a compartment containing electronic components mounted on the interior surfaces of at least some of said panels, said face panels including opposed north-facing and south-facing panels which undergo minimal sun-exposure and therefore provide safe interior surfaces for the electronic components mounted thereon, said face panels also including side panels which are successively rotated into periodic sun-exposure attitude during which their temperature normally rises so excessively as to damage electronic powering components mounted on the interior surfaces thereof, said side panels including opposed Earth-facing and anti-Earth-facing panels, and opposed east-facing and west-facing panels, said east-facing and said west-facing panels being provided with at least one continuous circulation system containing a heat exchange fluid, which continuous circulation system is in contact with both of said panels to absorb heat from the one of said panels undergoing sun exposure and circulate and transfer the heat to the other of said panels.

2. A spacecraft according to claim 1 in which each of said east-facing and west-facing panels has an interior wall and an exterior wall space therefrom, and said continuous circulation system is located within the space between said walls.

3. A spacecraft according to claim 2 in which said circulation system comprises a plurality of spaced parallel heat-conductive continuous conduits, each containing a circulating heat exchange fluid which transfers said heat to the opposed panel to moderate the temperatures of both panels.

4. A spacecraft according to claim 1 in which heat absorbing means are provided on the exterior surfaces of the Earth-facing and anti-Earth-facing panels in heat exchange association with said continuous circulation system in order to absorb and transfer heat to the east-facing and west-facing panels at orbit position in which neither of said panels is directly exposed to the sun.

5. A spacecraft according to claim 4 further comprising means for shielding said heat-absorbing means from exposure to the sun at orbit positions in which the Earth-facing and anti-Earth facing panels are not undergoing direct sun exposure.

6. A spacecraft according to claim 1 in which communication reflectors mounted to the exterior of said spacecraft provide a heat absorbing means in heat exchange association with said continuous circulation system in order to absorb incident sun energy and transfer it to the east-facing and west-facing panels at orbit positions in which neither of said panels is directly exposed to the sun.

7. A spacecraft for deployment in a substantially equatorial orbit about the earth, said spacecraft having a plurality of face panels having substantially fixed attitude relative to the earth and enclosing a compartment containing heat producing equipment, said plurality of face panels comprising a substantially east-facing and an opposed substantially west-facing panel, said east-facing and said west-facing face panels each having an interior surface and an exterior surface, said east-facing panel and said west-facing panel being rotated alternately between substantial sun exposure and minimal sun exposure causing said panels to have a peak temperature and a periodic temperature variation, said spacecraft further comprising a heat transferring means for reducing said peak temperature and said periodic temperature variation, said means comprising:

a. radiator means attached to each exterior surface of said east-facing and said west-facing panels, radiating into space heat from said equipment within said compartment and absorbing a limited quantity of incident sun energy into said panels;

b. a heat distribution means for transporting a portion of total energy absorbed in the one of said panels to the other of said panels wherein said heat distribution means is disposed between the exterior surface and interior surface of each of said panels.

8. A spacecraft according to claim 7 wherein the plurality of face panels further comprises opposed, substantially north-facing and substantially south-facing panels which undergo limited sun exposure providing safe surfaces for mounting additional temperature sensitive equipment.

9. A spacecraft according to claim 8 in which the average temperature of said east-facing and said west-facing panels is more than twenty degrees Celsius greater than the average temperature of said north-facing and said south-facing panels.

10. A spacecraft according to claim 7 in which equipment whose performance can be degraded by exposure to temperature variation is mounted on the interior surfaces of said east-facing and said west-facing panels is chosen from the group of equipment consisting of traveling wave tube amplifiers, radio frequency switches, output multiplexers, radio frequency wave guides, radio frequency power combiners.

11. A spacecraft according to claim 7 wherein said heat distribution means comprises at least one continuous circulation system containing a heat exchange fluid which is in heat-conducting contact with both of said panels to absorb heat from the one of said panels undergoing sun exposure and circulate and conduct it to the other of said panels to moderate the temperature of the east-facing and west-facing panels.

12. A spacecraft according to claim 11 wherein said heat exchange fluid is selected from the group of heat exchange fluids consisting of water, ammonia, and toluene.

13. A spacecraft according to claim 7 in which said radiator means comprises a material highly reflective to optical radiation while behaving approximately like a black body radiator for infrared radiation.

14. A spacecraft according to claim 1, wherein the continuous circulation system transfers heat for moderating the temperature of the east-facing and west-facing panels and increasing the total interior surface area suitable for the safe mounting of components.

15. A spacecraft according to claim 7, wherein the heat distribution means comprise at least one continuous pipe connecting said east-facing and west-facing panels, said continuous pipe being disposed between the exterior surface and interior surface of each of said panels.

16. A spacecraft comprising a plurality of face panels forming a compartment containing electronic components mounted on interior surfaces of at least some of said panels, said face panels including opposed north-facing and south-facing panels, and side panels disposed between said north-facing and south-facing panels, said side panels including generally opposed Earth-facing and anti-Earth facing panels, and generally opposed east-facing and west-facing panels, said east-facing and said west-facing panels being provided with at least one continuous pipe system containing a fluid, which continuous pipe system is in contact with both of said panels for absorbing heat from the one of said panels and transferring the heat to the other of said panels.

17. A spacecraft according to claim 16, wherein the spacecraft is deployable in a geosynchronous orbit about the Earth, said face panels being successively rotated into periodic sun-exposure attitude, and wherein said continuous pipe system absorbs and transfers heat from one of said panels undergoing sun exposure.

* * * * *